Aug. 27, 1935.  K. R. HODGES  2,012,815

BUN AND APPARATUS FOR MAKING SAME

Original Filed July 26, 1933

INVENTOR.
Karl R. Hodges.
BY Walter C. Ross
ATTORNEY.

Patented Aug. 27, 1935

2,012,815

UNITED STATES PATENT OFFICE 2,012,815

BUN AND APPARATUS FOR MAKING SAME

Karl R. Hodges, Indian Orchard, Mass.

Application July 26, 1933, Serial No. 682,300
Renewed January 30, 1935

2 Claims. (Cl. 53—6)

This invention relates to improvements in bakery products and apparatus for making this new article of manufacture.

The invention is directed more particularly to the provision of a novel biscuit or bun of the type commonly referred to as a Frankfurter or sausage roll.

The invention has for its principal objects the provision of an apparatus for making a bakery product which is adapted to readily receive an object or objects and to embrace it or them in a relatively secure position. As a further object the invention is directed to providing a roll having a longitudinal bore therethrough with a slot leading into the bore and a device for facilitating the formation of such a product.

The bun of this invention is of convenient shape and form and has a wide variety of uses. The novel device herein described is economical and simple so that the product may be easily and inexpensively manufactured.

Various novel features and advantages of the invention will be more fully described in connection with the accompanying drawing wherein.

Figure 1:
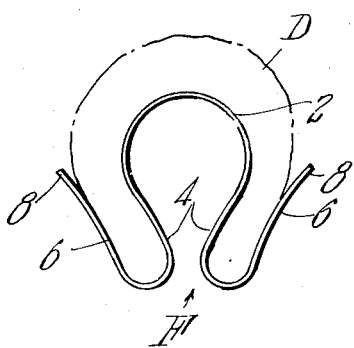
Fig. 1 is an end elevational view of the apparatus of the invention showing unbaked dough disposed thereon in dot-dash lines.

Referring now to the drawing more in detail, the invention will be fully described.

Figure 3:
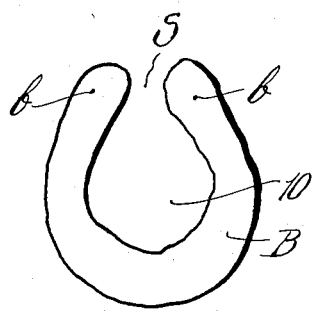
Fig. 3 is an end elevational view of the bun of the invention.
Figure 2:
Fig. 2 is a small-scale side elevational view of the apparatus shown in Fig. 1.

The apparatus of the invention shown in Figs. 1 and 3 may be called a form F. It is relatively rigid but is preferably made of material which may be bent as shown such as a relatively thin and flat sheet of metal. This sheet is bent intermediate its opposite sides three times in substantially the manner shown.

By bending the material in its middle portion as shown a central curved section may be provided. This section may be called a bore-forming section for reasons which will soon appear and preferably consists of a curved upper portion 2 and side walls 4.

These side walls 4 extend downwardly in converging relation from opposite sides of the upper portion 2, as shown. Since they converge towards one another but do not meet, there is thus provided a slot-like aperture which leads into the longitudinal opening formed by the upper portion 2 and the side walls 4. The upper portion 2 is preferably wider of course than the slot.

The lower ends of the side walls 4 then are bent outwardly in opposite directions to provide channel-forming portions 6. These portions 6 curve back and upwardly into substantial parallelism with the side walls 4 to co-operate therewith and form trough-like channels. If desired, the extremities 8 of the side portions 6 may diverge outwardly as shown in Figure 1; this facilitates the formation of the product but is not absolutely essential to the construction of the device.

In the practice of the invention, unbaked dough D is disposed around the form F in the manner shown in Fig. 1 by dot-dash lines. Since the dough D is soft and pliable it readily conforms to the relatively rigid form F and has a longitudinal bore and a slot leading thereinto with lip portions at opposite sides of the slot.

The form and its contents are then put in an oven and baked and the product of the invention, a bun B is formed. The dimensions of the roll or bun B will of course depend on the dimensions of the form. As the dough raises and is baked, it of course expands and the trough-like portions of the form F serve to limit the expansion at certain places.

The bun or roll of the invention will now be described in detail. A main body portion B is provided with upwardly and inwardly extending lip portions b. While the main body portion B is formed around the upper part 2 of the form F, the converging lip portions b are formed between the side walls 4 and the end portions 6 of the form.

Since, as stated, the trough-like portions of the form limit the expansion of the rising dough in contrast with the unlimited expansion of the body portion, the opposite side walls or lip portions of the baked bun converge to form a slot S therebetween. The bore-forming section of the form provides a longitudinal bore 10 into which the slot S extends. As a result, the opposite ends of the bun are open and a relatively narrow slot S extends into the bore 10 as shown. Since baked dough is relatively flexible, the side walls or lip portions b of the bun are yieldable so as to permit access to the bore 10 and tend to close around an object or any material in the bore.

Figure 4:
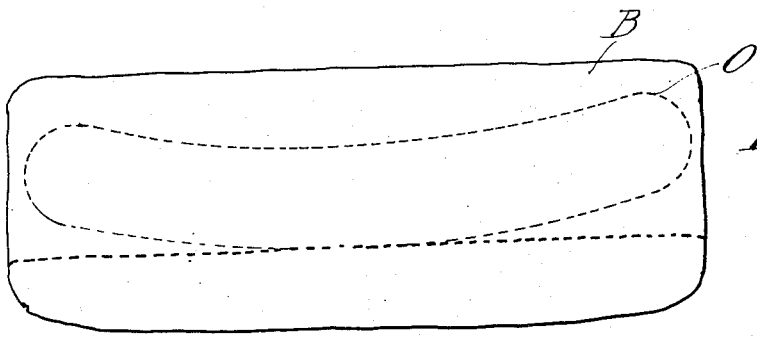
Fig. 4 is a side elevational view of the bun shown in Fig. 3.

It is well-known that edible objects commonly called Frankfurters do not all have the same shape nor are they all of the same size. That is to say, they are more or less curved intermediate their ends, as shown by dot-dash lines in Fig. 4, and they vary in length as well as diameter.

It may therefore be readily seen that whereas it is commercially desirable to have bore-forming devices which are of uniform shape and size, it is also desirable to have the bun relatively yieldable so that it will more or less conform to the size and shape of the object to be inserted therein. It is also desirable and an important feature of this invention that the bun be so formed that the object or objects disposed within the bore be relatively firmly embraced.

According to this invention, the converging and yieldable side walls or lip portions *b* serve both a flexing and an embracing function, while the slot 10 formed by the device makes it possible to insert material such as mustard or the like through the top of the roll onto an object in the bore. The object may be inserted through one of the open ends or through the slot.

It is desired to point out that other foods such as salads or the like may be placed in the bore of the bun. In any event, the converging lip portions serve to hold the material in the bun and the relatively yieldable walls serve to permit flexible access to the bore.

While I have described my invention in great detail and with respect to preferred embodiments thereof, I do not desire to be limited to such detail or embodiment, since many changes and modifications may be made without departing from the spirit and scope of the invention in its broader aspects. Hence, what I desire to claim as new and secure by Letters Patent of the United States is:

1. As a new article of manufacture, a device for forming a bun having a longitudinal bore extending therethrough and a longitudinal slot extending through a side thereof into said bore comprising a piece of relatively thin sheet material bent intermediate its opposite sides to provide a central bore-forming section having a curved upper portion and side walls extending from opposite sides of the curved portion in converging relation to provide a slot leading into said bore-forming section and side portions extending outwardly in opposite directions from the lower sides of said converging side walls and upwardly into substantial parallelism therewith, the said curved portion being of greater width than said slot.

2. As a new article of manufacture, a device for forming a bakery roll having a longitudinal bore of a certain diameter extending therethrough and a slot in a side thereof of less width than the said diameter of the bore comprising, a piece of relatively thin sheet material bent intermediate marginal sides to form a central bore-forming portion having an upper side of a certain diameter curving outwardly and downwardly to the upper marginal edges of inner trough-forming portions which converge downwardly and have their lower edge portions spaced apart a certain distance and then curve outwardly and upwardly from said lower edge portions to provide outer trough-forming portions in substantial parallelism with said inner trough-forming portions to provide troughs of a certain width on opposite sides of said central bore-forming portion, the upper marginal edges of said outer trough-forming portions being in substantially the same plane as said upper marginal edges of said inner trough-forming portions.

KARL R. HODGES.